United States Patent

[11] 3,575,470

[72] Inventor   Frank L. Meyer
                Houston, Tex.
[21] Appl. No.  815,368
[22] Filed      Apr. 11, 1969
[45] Patented   Apr. 20, 1971
[73] Assignee   Shell Oil Company
                New York, N.Y.

[54] IMPERVIOUS BODY INJECTION ARRANGEMENT FOR PREVENTING PIPELINE SLUMPING
7 Claims, 4 Drawing Figs.

[52] U.S. Cl. .................................................. 302/14,
                                                    302/64, 302/66
[51] Int. Cl. .................................................. B65g 53/30
[50] Field of Search ...................................... 302/14, 15,
                                                    16, 64, 2, 66

[56]                References Cited
                  FOREIGN PATENTS
536,529   11/1929   Germany...................... 302/14
587,335   4/1947    Great Britain................. 302/14

Primary Examiner—Andres H. Nielsen
Attorneys—Thomas R. Lampe and J. H. McCarthy

ABSTRACT: Method and apparatus for limiting downhill slumping in a shutdown slurry pipeline. Devices are placed along the sloping portions of the pipe whereby impervious bodies are injected into the pipeline through conduits when flow conditions dictate. The impervious bodies limit downward movement of the slurry solid phase when the principal driving force is gravity.

PATENTED APR 20 1971 3,575,470
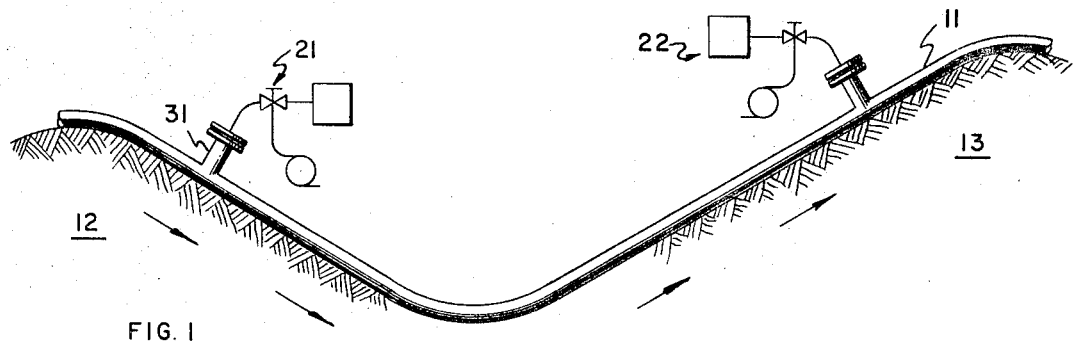
FIG. 1
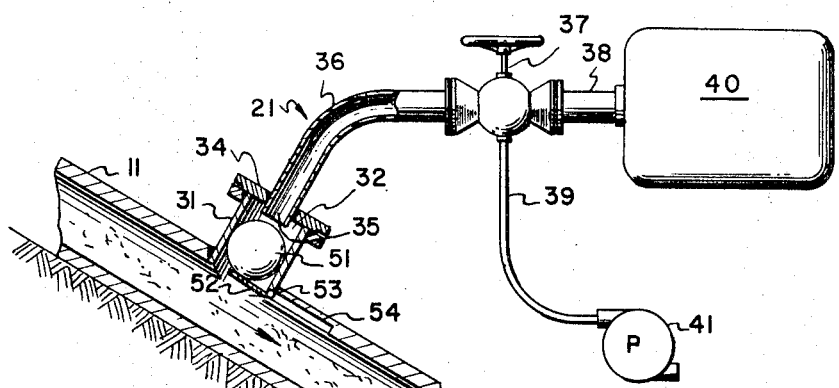
FIG. 2
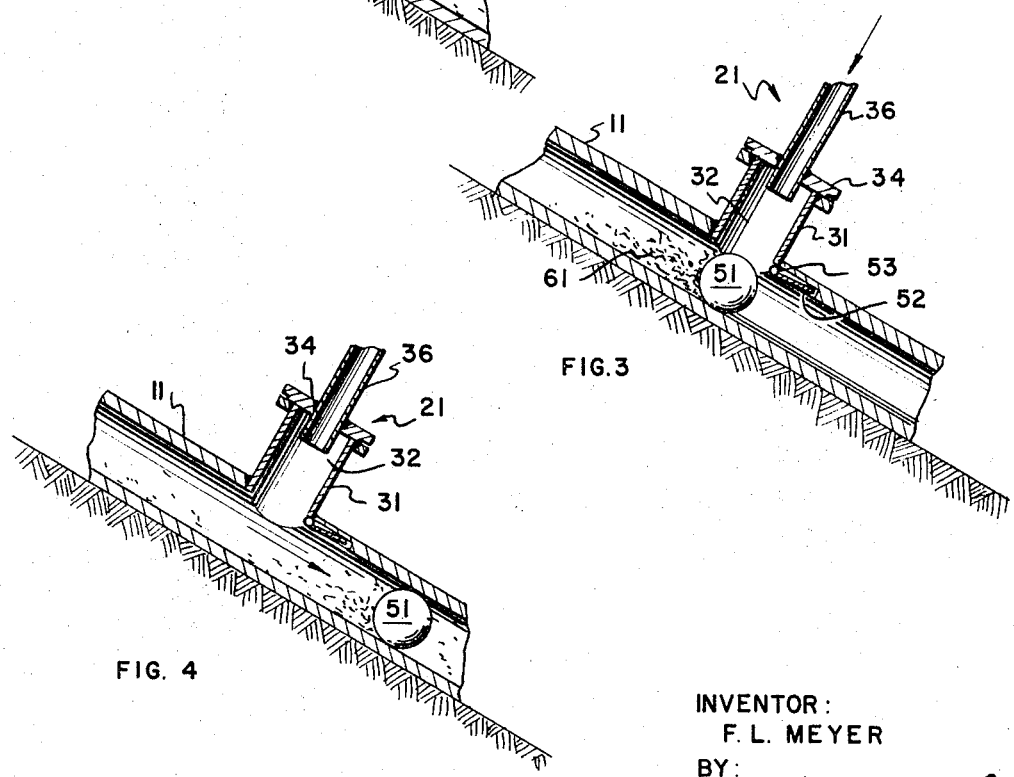
FIG. 3
FIG. 4
INVENTOR:
F. L. MEYER
BY: Thomas R Lampe
HIS ATTORNEY

IMPERVIOUS BODY INJECTION ARRANGEMENT FOR PREVENTING PIPELINE SLUMPING

The present invention relates to pipeline transport operations; and more particularly, to a method and apparatus for limiting the downward movement of slurry particulate solids in inclined portions of a pipeline during periods when the pipeline flow is incapable of suspending the slurry solid particles.

Transportation by pipeline is a major and growing industry. With the use thereof formerly confined almost entirely to movement of water, gas and petroleum products, pipelines, with the advent of slurry transport, have become useful for long and short hauls of a wide variety of raw materials and finished products.

With respect to the pipeline transportation of materials in slurry form, problems may arise when such materials are moved through pipelines inclined to go over a hill or down into a valley with inclinations which may cause slumping. At these locations, during a planned or emergency line shutdown or flow reduction, the solids of the transported slurry may settle out vertically and subsequently slide down the inclined portions of the pipeline, thereby causing a compacted plug which may be very difficult to dislodge and move thereby preventing pipelining operations.

These difficulties are most commonly avoided by laying solids-carrying or slurry pipelines so that they do not exceed a slope of angle of inclination below which slumping or sliding does not occur. Alternatively, the inclined pipeline sections are emptied or flushed at each shutdown. Obviously, these alternative prior art approaches are not always feasible or economical, especially in those situations where long and relatively steep slopes are encountered. Slops of this nature are being encountered with increasing frequency as pipeline operations are being extended to new relatively inaccessible mountainous areas in the United States and elsewhere.

SUMMARY OF THE INVENTION

It is therefore a primary object of the present invention to provide an improved and economical apparatus and method whereby slurry material being transported in an inclined pipeline section is restricted to limited slumping during a line shutdown.

This and other objects have been attained in the present invention by providing a method and apparatus for limiting downhill slumping in a shutdown slurry pipeline wherein impervious body injection devices are located at predetermined intervals along portions of the pipeline, said devices being adapted to inject impervious members into the pipeline when the pipeline flow rate or pressure falls below some predetermined minimum value. These impervious bodies, which may be rubber spheres, foam pigs, cup scrapers, etc., seal against the inner peripheral wall of the pipeline to prevent the solid phase of the slurry material from slumping to the lowest portion of the pipeline and forming a plug in the pipeline. When slurry flow is recommenced the impervious bodies may be withdrawn into the body injection devices or carried downstream under pressure of the pumped slurry for subsequent recovery from the line.

DESCRIPTION OF THE DRAWING

The above-noted and other objects of the present invention will be understood from the following description, taken with reference to the accompanying drawing. In describing the invention in detail, reference will be made to the drawing in which like reference numerals designate corresponding parts throughout several view in which:

FIG. 1 is a diagrammatic view illustrating a given length of slurry pipeline which has been modified in accordance with the teachings of the present invention; and FIG. 2, 3 and 4 are enlarged cross-sectional views in longitudinal projection illustrating an inclined portion of the pipeline section of FIG. 1 with an impervious body injection mechanism in operative association therewith in accordance with the teachings of the present invention, and illustrating said mechanism and impervious body in positions assumed thereby during different stages in the operation thereof.

Referring now to FIG. 1, a given length of slurry pipeline 11 is illustrated in the position assumed thereby as the pipeline proceeds to and from a valley formed between two hills or mountains 12 and 13. The terrain illustrated is typical of that encountered in pipeline laying activities, although it should be understood that the teachings of the present invention may be carried out in any topographical configuration wherein a portion of slurry pipeline is inclined.

The transportation of slurries consisting of solid particles in a fluid medium by use of pipelines similar to that disclosed in FIG. 1 is quite well known, and such expedient is finding increasing use, especially in those situations where the source of raw materials is relatively remote and inaccessible from the point of delivery, which may be a suitable processing plant, for example. In the disclosed arrangement, it may be assumed for purposes of illustration that the slurry material being transferred through pipeline 11 as by means of pumps (not shown) or gravity is moving through the line in the direction indicated by the arrows. However, the teachings of the present invention are, of course, applicable regardless of the direction of flow of the slurry.

As long as sufficient flow continues in the pipeline, the solid matter of the slurry will remain suspended in liquid, even when the solid matter has a higher specific gravity than the liquid. If, however, the flow is stopped or sufficiently reduced for any reason, i.e., the pipeline is shut down or fails, such solid matter will settle. In the situation where the line is horizontal or the slope of the line is insufficient to cause sliding of the settled solids, no problem is created by such settling. Under these conditions, a liquid-rich channel remains open in the top of the line cross section which allows the settled material to be resuspended with a minimum of difficulty upon resumption of flow.

A serious problem can exist when the pipeline must be inclined to go over a hill or down a valley, as illustrated, for example, in FIG. 1. At these locations, the settling of solids followed by their sliding down the slope during a protected shutdown can result in a compacted plug of material difficult or impractical to move or resuspend. In the illustrated pipeline configuration, such solids would slide downwardly into the valley formed between hills or mountains 12 and 13. The solid material would then compress under its own weight to form a plug in the valley in an obvious manner.

Such plug formation is prevented in accordance with the teachings of the present invention as follows.

Disposed at preselected locations along the inclined portions of pipeline 11 are a plurality of impervious body injection devices. While only two such injection devices (designated generally by means of reference numerals 21 and 22) are shown in FIG. 1, it should be understood that the number of such devices employed in combination with the pipeline 11 is determined by such factors as length of the inclined portion of pipeline, density of the slurry material solid and liquid phases, etc. The operation and construction of one such injection device, i.e., injection device 21, will be described below and it is to be understood that the construction and operation of other injection devices employed along the pipeline are similar.

As may be seen with reference to FIGS. 1 and 2, injection device 21 includes a housing conduit or member 31 which projects outwardly from pipeline 11 and defines an inner chamber 32 communicable with the interior 33 of the pipeline 11. The housing conduit 31 may comprise an integral part of pipeline 11 or may be a separate member secured to the pipeline in any known manner, as by welding. The housing conduit 31 is closed at its upper end by means of a cap or closure element 34 which has a passageway or thoroughbore 35 extending therethrough. Throughbore 35 provides communication between chamber 32 and the interior of a pipe 36 which is secured to closure element 34 as by means of screw threads or welding.

Pipe 36 terminates its other end at valve 37 which may be of any desirable construction. Valve 37 is adapted to either (1) completely close or seal off pipe 36 at its outer end or (2) selectively provide communication between pipe 36 and either one of two conduits 38 and 39 which are also operatively associated with the valve 37. Conduit 38 is connected at its other end to a suitable supply tank 40 filled with pressurized pneumatic or hydraulic fluid. Conduit 39, on the other hand, is connected to the inlet of a vacuum-producing pump 41 which may be of any suitable construction.

Disposed within chamber 32 of housing conduit 31 is an impervious body 51, which in the illustrated embodiment of the present invention is in the form of a sphere constructed of rubber, plastic foam or other similar yieldable or resilient material. The resilient material used in he construction of the sphere should be chosen so that it does not chemically react with the slurry material being transported by pipeline 11. While slurry material is being conveyed by the pipeline, the impervious body 51 is maintained within chamber 32 by means of a plate 52 which is pivotally mounted on hinge element 53 positioned at the lower end of housing member 31. Plate 52 is normally maintained in the position illustrated in FIG. 2 as by means of a spring biasing means (not shown) as regular pipeline transport is being carried out.

When, however, the pipeline 11 is shut down or flow reduced sufficiently for any reason, as for example, for maintenance activities, plate 52 is pivoted about hinge element 53 to the position illustrated in FIG. 3. A portion of pipeline 11 is grooved out as at 54 (FIG.) 2) to accommodate the plate 52 so that the lower surface of the plate (as viewed in FIG. 3) lies substantially flush with the inner peripheral surface of pipeline 11. Any suitable arrangement may be utilized to impart this pivoting movement to plate 52. For example, a lever (not shown) may be interconnected to the plate at the site of injection device 21 which may be manually operated. Alternatively, an electrical or hydraulic actuator mechanism of any suitable construction may be employed for this purpose.

At substantially the same time that the plate 52 is pivoted from the position of FIG. 2 to that of FIG. 3, valve 37 is actuated to provide communication between pressurized fluid supply tank 40 and inner chamber 32 of housing member 31. Impervious body 51 is of a size such that it is positioned within chamber 31 in sealing engagement with the inner peripheral wall of housing member 31 and accordingly a pressure builds up on the upper surface of the resilient body as soon as valve 37 provides communication between pressurized fluid supply tank 40 and inner chamber 32. This pressure serves to force the impervious body 51 into the interior of pipeline 11 as shown in FIG. 3. As with respect to the operation of plate 52, actuation of valve 37 may be carried out manually. However, it may be desirable to provide some suitable conventional arrangement whereby actuation of the valve and the plate is carried out automatically upon termination of flow in pipeline 11. The injection may be by automatic or manual mechanical methods also.

The outer diameter of impervious body 51 is greater than the inner diameter of pipeline 11 so that the impervious body forms a seal with the pipeline after being injected therein in the above-described manner. In the inclined portions of the pipeline, upon termination a reduction of slurry material flow, the solid phase of the slurry tends to settle out and slump or slide down the pipeline. If sufficient quantities of the slurry material solid phase slump into position at the lowermost portions of the pipeline, compacting of the solid phase may occur and a plug may be formed in the pipeline which would be difficult or impractical to dislodge upon restart of slurry transport activities. The seam formed between resilient body 51 and pipeline 11 is of sufficient strength to block the gravity-induced downward flow of the slurry solid phase, as at 61. Accordingly, the slumping of solid phase slurry material in the pipeline is terminated before sufficient quantities of same have an opportunity to build up and compact, thereby preventing a plug of sufficient magnitude so as to preclude restart of the pipeline.

After the desired operations which resulted in the shutdown or slow down have been carried out, the pipeline is restarted and transport of slurry material through the pipeline 11 is recommenced. Just prior to such pipeline restart, valve 37 is actuated so that chamber 32 is placed in communication with a lower pressure. This action results in the upward movement of impervious body 51 into chamber 32. Plate 52 is once again pivoted to the position illustrated in FIG. 2 and the slurry material is permitted to flow freely through pipeline 11. The impervious body 51 is then in position to once again be injected into the pipeline by injection device 21.

The above-described arrangement is only representative of the type of injection devices which might be utilized in carrying out the teachings of the present invention. For example, rather than employing a pressurized fluid supply tank and a vacuum pump for respectively injecting the impervious body into the pipeline and removing same under vacuum, a single reversible pump may be valve-connected to chamber 32 to supply both the injection pressure or retrieval vacuum as desired. In addition, any suitable mechanical means may be employed to inject or retrieve the impervious body instead of the disclosed fluid pressure arrangement.

If desired, the impervious body need not be retrieved into the chamber 32 upon restart of the pipeline. Instead, the impervious body may be carried downstream in the line pressure of the pumped slurry material, and extracted from the pipeline at some other point. This approach which is illustrated schematically in FIG. 4, eliminates the need for a source of vacuum pressure to retrieve the resilient body into the housing member chamber. To accomplish this, however, the relative dimensions of the impervious body and the throughbore of the pipeline must be such that the impervious body will resist downward flow under pressure of the slurry material when the only driving force is gravity, yet permit movement of the impervious body through the pipeline under the pumped pressure of the slurry material.

I claim:

1. Apparatus for preventing plug formation of slurry-material solid phase in a shutdown pipeline adapted to transport a slurry including a liquid phase and a solid phase, said apparatus comprising:
    a pipeline defining an interior, said pipeline being inclined with respect to the horizontal over at least a portion of its length and having at least one portion where plug formation is likely to occur upon shutdown of said pipeline and gravity flow of said slurry into said latter portion from said inclined portion;
    impervious body injection means operatively associated with said pipeline and positioned at the inclined portion of the pipeline; and
    impervious body means having an outer diameter slightly greater than the inner diameter of said pipeline operatively associated with said impervious body injection means whereby said impervious body means is adapted to inject said impervious body into the interior of said pipeline upstream of said portion where plug formation is likely to occur and free of said injection means when slurry flow in said pipeline is terminated or reduced, said impervious body forming a seal with the walls of said pipeline after injection into the pipeline to limit downward slumping of the slurry material solid phase under gravity flow into said portion where plug formation is likely to occur.

2. The apparatus of claim 1 wherein said impervious body injection means includes a housing adapted to accommodate said impervious body means when slurry transport activities are being carried out and means operable upon termination or reduction of slurry flow to force said impervious body means out of the housing and into said pipeline.

3. The apparatus of claim 2 wherein said means operable to force said impervious body means out of the housing includes a source of pressurized fluid operatively associated with the housing and adapted to build up pressure in the housing on one side of said impervious body means.

4. The apparatus of claim 3 wherein said impervious body injection means further includes means selectively movable between said impervious body means and the interior of said pipeline.

5. A method of preventing plug formation of a slurry material solid phase in a shutdown pipeline adapted to transport a slurry including a solid phase and a liquid phase, said method comprising the steps of:

terminating slurry flow in an inclined portion of the pipeline; and injecting at least one resilient body into the interior of the pipeline at said inclined portion and upstream of an area of said pipeline where plug formation is likely to occur due to gravity flow upon shutdown of said pipeline with the relative dimensions of the said pipeline and said resilient body being such that said resilient body lies adjacent to the inner peripheral wall of said pipeline to form a seal to block slumping of the slurry material solid phase and resist downward movement of the impervious body within the pipeline under pressure of the slurry material when the only driving force is gravity.

6. The method of claim 5 wherein the impervious body is removed from the pipeline prior to restart of the pipeline transport operations.

7. The method according to claim 5 wherein a plurality of impervious bodies are injected into the pipeline upon termination or reduction of slurry material flow within the pipeline.